United States Patent [19]
Jensen et al.

[11] 3,818,222
[45] June 18, 1974

[54] RADIATION MODULATION APPARATUS
[75] Inventors: Arthur S. Jensen, Baltimore, Md.;
James L. McIntyre, Big Flats, N.Y.;
Homer A. Humiston, Arnold, Md.
[73] Assignee: Westinghouse Electric Corporation, Pittsburgh, Pa.
[22] Filed: May 14, 1973
[21] Appl. No.: 360,271

[52] U.S. Cl.............. 250/213 R, 250/230, 350/161
[51] Int. Cl....... G02f 1/28, H01j 31/50, G01d 5/30
[58] Field of Search........ 350/161; 250/213, 220 M, 250/230

[56] References Cited
UNITED STATES PATENTS
3,137,762  6/1964  Baumgartner et al.............. 350/161
3,638,027  1/1972  Koelmans....................... 350/161 X Primary Examiner—Archie R. Borchelt
Assistant Examiner—T. N. Grigsby
Attorney, Agent, or Firm—C. L. O'Rourke

[57] ABSTRACT
Radiation modulating apparatus is disclosed comprising a plurality of mirror surfaces disposed to receive radiation from a first unmodulated source. Each of the mirror surfaces is supported to permit deflection under the influence of a signal applied to an electrode disposed adjacent the mirror surface. The signal applied to the electrode is provided by a suitable radiation sensitive means such as a photodiode, upon which input radiation from a modulating source is directed. The radiation from the unmodulated source is isolated from the photodiode by a barrier comprised, for example, of a glass rod, which further serves to direct the radiation from the unmodulated source onto the mirror surface and, in turn, to direct the mirror modulated radiation therefrom. Further, the glass rod may serve to direct the radiation from the input source onto the photodiode to control thereby the deflection of the mirror surface and therefore, the modulation of the radiation from the unmodulated source. A plurality of the assemblies comprising the radiation sensing means and the mirror surfaces, may be assembled together to form at an input, an array of radiation sensing means for sensing an input radiation image, and an array of mirror surfaces whereby radiation from an unmodulated source is variously reflected by the plurality of mirror surfaces in accordance with the input radiation image.

14 Claims, 4 Drawing Figures

RADIATION MODULATION APPARATUS

BACKGROUND OF THE INVENTION

1. Field of the Invention

This invention relates to apparatus for modulating a source of unmodulated radiation and in particular, to such radiation modulators comprising a plurality of mirror surfaces.

2. Description of the Prior Art

In the prior art, there have been many attempts to develop a satisfactory radiation modulator whereby a source of uniform-intensity radiation is modulated. One contemplated application for such a radiation modulator is a large projection display or a light intensifier panel. It has been sugested to use a relatively thin film of a suitable insulating material, such as an oil or a thermal plastic, upon which a charge pattern is imposed by an electron beam. A source of uniform-intensity light is directed onto the insulating film, whose thickness and therefore whose reflecting properties have been varied in accordance with the charge pattern. The radiation of uniform intensity may be directed upon the insulating film by a Schlieren optical system to be modulated by and reflected from the thin insulating layer to provide an imgage display.

Radiation modulators of the prior art have used a plurality of mirror surfaces whereby radiation from a source is modulated dependent upon the position of the mirror surfaces with respect to its source. By deflecting selected mirror surfaces, selected portions of the radiation image are directed from the line of view, whereas the remaining mirror surfaces direct the radiation along a line to be displayed or to be viewed. In one example of the prior art, a plurality of mirrors may be mounted upon a filament to be rotated by an armature coil. The problem associated with such radiation reflectors is that of resolution and of providing a sufficient number of mirror surfaces capable of achieving a high resolution.

More recently, modulating apparatus has been proposed in which a plurality of stretched membranes are used as mirror surfaces and are bent or deformed under the influence of an electric field established by relatively high deformation voltages. However, because of the high tensile restoring forces established by the stretched membranes, it is necessary to use relatively high voltages to deform or deflect the stretched membranes. With voltages of reasonable amplitude, the deformation of such membranes is in the order of a wavelength of light so that only phase modulation of coherent light is possible. As a result, such devices incur the small tolerances and other problems of optical phase modulators. Typically, the deformation voltage required of modulators employing stretched membranes is in the order of 5000V. It is recognized that optical amplitude modulation systems are easier to operate reliably, but require significant mirror deflection.

SUMMARY OF THE INVENTION

It is therefore, an object of this invention to provide optical amplitude modulation apparatus capable of operation at signal levels significantly less than that required by the prior art.

It is a further object of this invention to provide radiation modulating apparatus employing a plurality of reflecting or mirror surfaces, capable of achieving a greater resolution than apparatus of the prior art.

It is even a further object of this invention to provide radiation modulating apparatus capable of modulating a source of radiation of a first type in accordance with a radiation image of a different type; for example, coherent radiation may be modulated in accordance with a non-coherent radiation image.

These and other objects are met in accordance with the teachings of this invention by providing radiation modulating apparatus comprising at least one reflective surface or mirror capable of being deflected to modulate radiation of substantially uniform intensity derived from a first source. The deflection of the mirror surface is effected by an electric field established by a signal imposed upon an electrode disposed adjacent to the mirror surface. The deflection signal is provided by a radiation sensitive device, such as a photodiode, disposed to receive input radiation from a second source. A dual purpose member is disposed to block radiation derived from the first source from being directed onto the radiation sensitive device, and to direct radiation from the first source to and from the mirror surface, as well as to direct radiation from the second source onto the radiation sensitive device. Thus, the radiation from the first source is modulated in accordance with the input radiation directed onto the radiation sensitive device, whose output in turn controls the deflection of the mirror surface.

A significant feature of this invention resides in the incorporation of a plurality of such mirror surfaces and radiation sensitive devices into an array, whereby the radiation from the first source is modulated by the mirror surfaces to form an image for display in accordance with an input radiation image directed onto the corresponding radiation sensitive devices.

A still further feature of this invention resides in the implementation of the above-described radiation modulator in the form of a semiconductor substrate in which there is formed the radiation sensitive device as a photodiode, and upon which the reflective surface is formed of a layer of a suitably reflective material such as gold, supported upon the substrate by a pedestal. The dual-purpose barrier member may illustratively take the form of a glass rod disposed between the photodiode and the reflective surface. A linear array of the radiation sensitive devices and corresponding reflective surfaces may be formed upon a common substrate and a plurality of such substrates may be assembled to form a two-dimensional array whereby uniform intensity radiation is modulated in accordance with an input radiation image.

DESCRIPTION OF THE DRAWINGS

These and other objects and advantages of the present invention will become more apparent by referring to the following detailed description and accompanying drawings, in which.

DESCRIPTION OF THE PREFERRED EMBODIMENTS

Figure 1A:
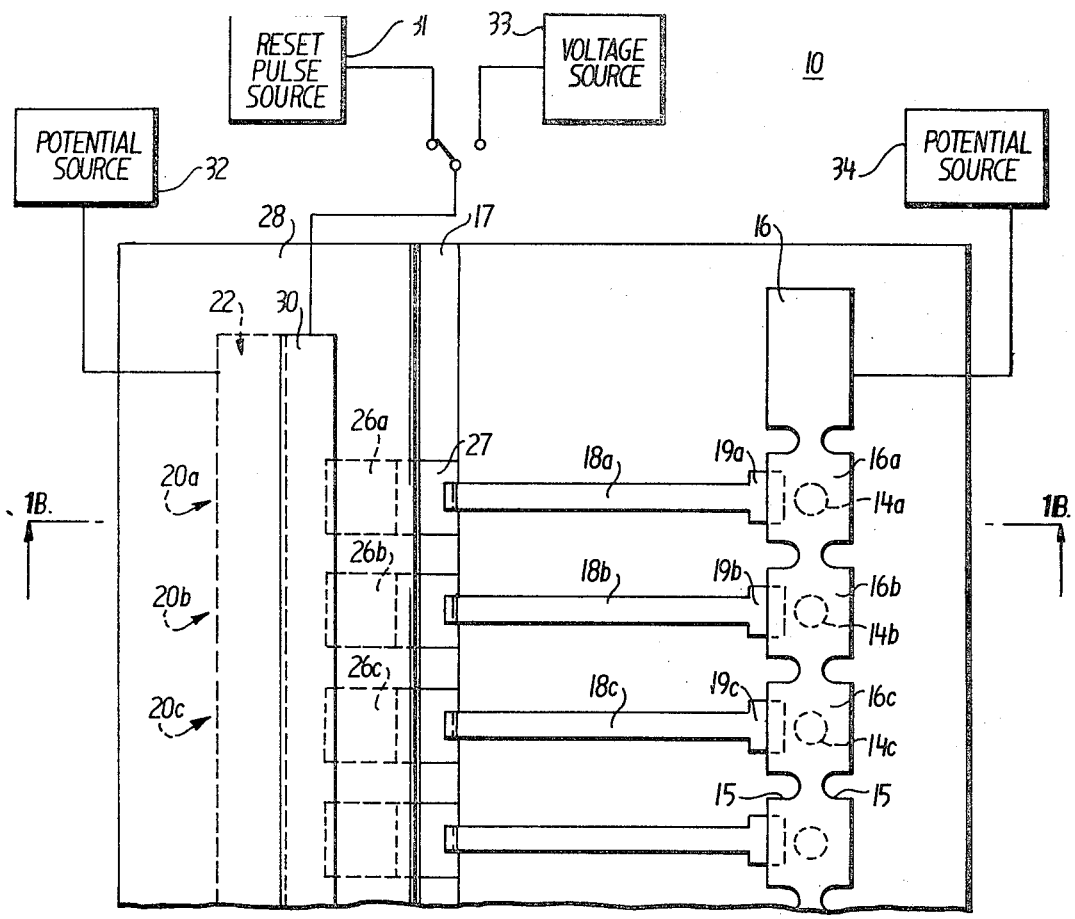
FIG. 1A and 1B are respectively a plan and sectioned view of an assembly incorporating a radiation sensitive device whose output controls the deflection of a reflective or mirror surface in accordance with the teachings of this invention.
Figure 1B:
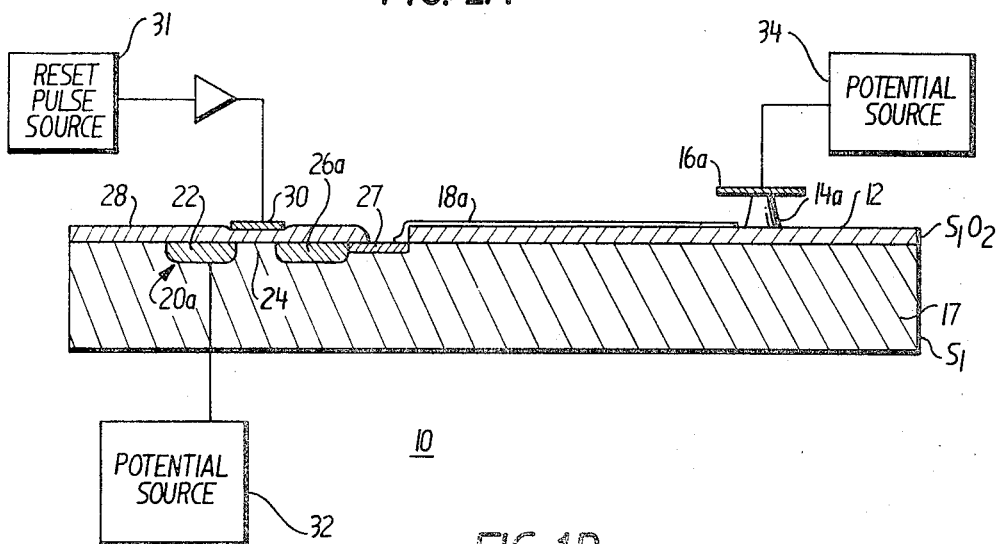

With regard to the drawings and in particular to FIGS. 1A and 1B, there is shown an assembly 10 for receiving a radiation sensitive device 20a whose output is applied by a conductive element or strip 18a to control the deflection of a reflective or mirror surface 16a. As will be explained later, suitable means is provided for directing input radiation onto the radiation sensitive device 20a and also for directing uniform-intensity radiation onto the mirror surface 16a. In the illustrative embodiment shown in FIG. 1A and 1B, the assembly 10 comprises a substrate 17 of a suitable semiconductive material, such as silicon, upon which there is disposed a first insulating layer 12 made of a suitable material, such as silicon dioxide $SiO_2$. A reflective surface indicated in FIG. 1B by the numeral 16a is supported upon the surface of the assembly 10 by a pedestal 14a. In an illustrative method of manufacture, a layer of a suitable material such as silicon, is sputtered upon the surface of the insulating layer 12. Next, a layer of a suitable reflective material, such as gold, having a thickness permitting deflection at relatively low signal levels, is deposited as by well-known evaporation techniques, upon the silicon layer. Thereafter, the circumferential portions of the silicon layer are removed by suitable, well-known etching techniques to leave the pedestal portion with a substantially flat, reflective layer 16a disposed thereon. A reflective layer 16a having a thickness of 0.25μm was found to be a thickness permitting deflection of approximately 4° when a signal developed by the radiation sensitive device 20a of below 100v amplitude is applied to the conductive strip 18a.

In the illustrative embodiment shown in FIG. 1B, the radiation sensitive device 20a is illustratively shown as a MOS transistor comprising a drain region 22 and a source region 26a formed by well-known diffusion techniques within the substrate 17, the regions 22 and 26a being of a conductivity type opposite to that of the substrate 17. A channel 24 is formed between the regions 22 and 26a and a gate electrode 30 is disposed upon a second insulating layer 28 formed upon a portion of the surface of the substrate 17, covering the channel 24. The output of the radiation sensitive device 20a is coupled to the conductive strip 18a by an electrically conductive region 27 formed, for example, by diffusing a high density of impurities of the same type as regions 22 and 26a into the silicon substrate 17. Though in FIG. 1B, a MOS transistor has been formed in the substrate, it is operated as a photodiode comprising region 26a and the substrate 17, in a manner to be explained more fully below. Further, it is understood that other radiation sensitive devices could be incorporated into the radiation modulator of this invention; for example, a phototransistor may be formed readily upon the substrate 17.

With regard to FIG. 1A, there is shown an illustrative arrangement by which a linear array of the radiation sensitive devices 20 may be formed for controlling a corresponding linear array of mirror surfaces 16. More specifically, each of the radiation sensitive devices takes the form of a MOS transistor comprising a common drain and common gate electrode 22 and 30, both disposed along the length of the assembly 10, and discrete, individual source electrodes 26a, 26b, 26c, etc., for each of the radiation devices 20. A plurality of conductive strips 18a, 18b, 18c, etc. are each connected to their corresponding source region 26 for applying their output to a corresponding electrode 19a, 19b, 19c, etc., for establishing an electrical field for deflecting the corresponding mirror surface 16. The mirror surfaces 16 are formed of a common reflective layer having opposing portions 15 removed therefrom to form each mirror surface 16 capable of being separately deflected. As indicated by a dotted line in FIG. 1A, the pedestal portions 14 are of substantially circular configuration and are centrally disposed of each of the mirror surfaces 16.

The operation of the assembly 10 in a "storage mode" will now be explained with regard to FIGS. 1A and 1B. A pulse source 31 applies a reset pulse to the common gate electrode 30 to reset all of the photodiodes and conductive strips 18 to a "black 'on' signal" condition. Upon being reset by the pulses derived from the source 31, a field is established by the electrodes 19 upon their corresponding reflective surfaces 16, which are deflected to their maximum. More specifically, the reset pulse momentarily turns the MOS transistor "on" to permit conduction across each of the channels 24 to apply a potential illustratively in the order of −50V, from a potential source 32 connected to the common drain electrode 22, to each of the photodiodes formed by the discrete source regions 26a, 26b, 26c, etc. Then, with the radiation sensitive devices 20 shielded from radiation, a voltage is set upon the common gate electrode 30 by a voltage source 33 to turn "off" the MOS transistors, i.e. no current is conducted through the channels 24 thereof. Then, the array of radiation sensitive devices is exposed to an input image for a short period of time by a shutter (not shown). The photocharge that flows in particular photodiode depends upon its exposure, i.e. the product of the intensity of the input radiation and the exposure interval. As one of the photodiodes is exposed, the potential stored in the inherent capacitance of the photodiode is discharged toward a positive voltage imposed upon the substrate 18 by a potential source 34, illustratively of a value of +50V. As a result of the photodiode discharge, the potential established by the conductive strips 18 upon the electrodes 19 changes, whereby the degree of deflection of the corresponding mirror surface 16 is changed, dependent upon the signal established upon the corresponding electrode 19 and the radiation incident upon the corresponding radiation device 20. By employing the voltage sources 32 and 34 in the arrangement shown in FIGS. 1A and 1B, a half-full voltage biases the mirror or reflective surface 16 to a one-quarter bend because of the square law mirror bending response. This circuit arrangement requires less switching voltage; however, the photodiode still must withstand the full voltage, i.e., 100V. The biasing voltages established upon the electrodes 19a, 19b, 19c, etc. remain as a stored pattern until they decay through the photodiode dark current, or until they are erased by a reset pulse derived from the source 31.

In an alternative mode of operation of this invention termed a "continuous mode", the MOS transistors comprised of the regions 22, 24 and 26 are biased to a triode condition. The input radiation induces a photocurrent supplied through the MOS channels 24 associated with the particular photodiode formed of the corresponding region 26. The photocurrent determines the output established upon the discrete source region 26, which is connected to the corresponding electrode 19. Thus, the electrode voltage is a function of the photocurrent of a particular radiation sensitive device and changes with time as the intensity of the input radiation changes.

Figure 2:
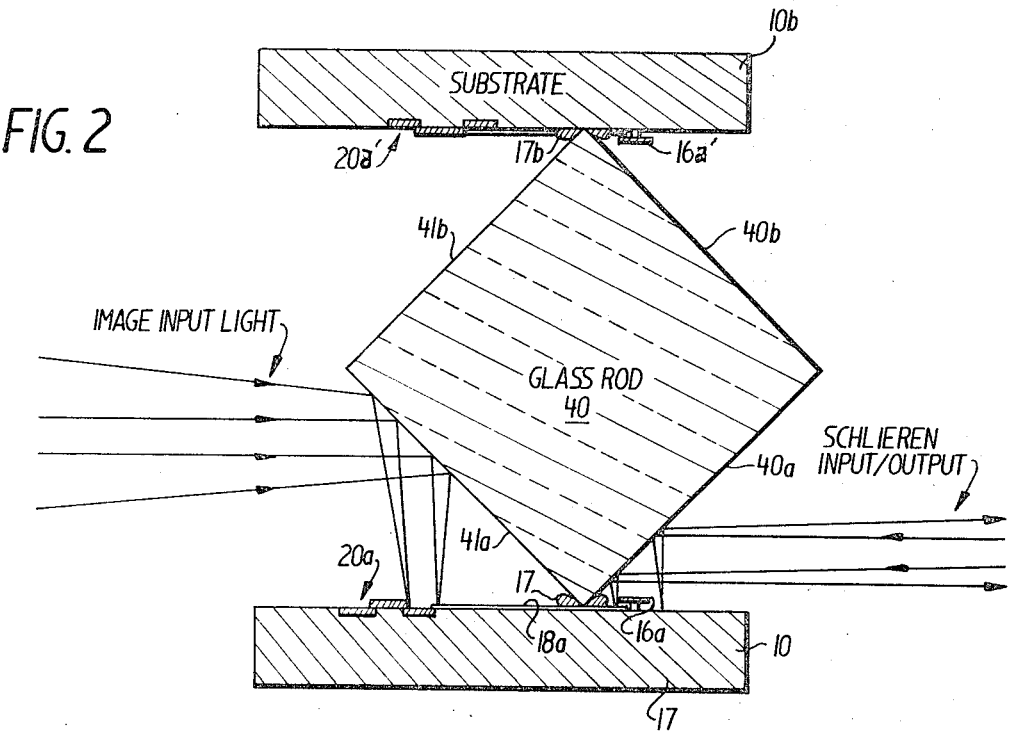
FIG. 2 is a side view of an assembly as shown in FIG. 1, incorporating a glass rod for directing an input radiation image onto the radiation sensitive device and for directing a uniform-intensity radiation to and the mirror modulated radiation from the mirror surface.

The complete operation of the radiation modulator of this invention will become more fully understood when considered with FIG. 2. More specifically, FIG. 2 shows an assembly 10 as described above with regard to FIGS. 1A and 1B, in combination with a reflecting member 40 illustratively taking the form of a glass rod having a first highly-reflective specular surface 40a for directing substantially uniform radiation onto the linear array of mirror surfaces 16 and for reflecting therefrom the radiation as modulated by the deflected mirror surfaces 16. The reflective member 40 serves the further purpose of isolating the uniform radiation as dervied from a first source, from the input section of this invention, including the radiation sensitive devices 20. The input radiation as derived from a second source is directed by a specular reflective surface 41a onto the photodiode portion of the radiation sensitive device 20. As will be explained more fully later, it may be desirable to form a similar assembly 10b disposed in an opposing relationship to the assembly 10, whereby radiation derived from the second source is reflected by a surface 41b of the member 40 onto a second linear array of radiation sensitive devices, one of which is indicated by the numeral 20a', for controlling the deflection of a second array of mirror surfaces, one of which is indicated by the numeral 16a'.

With regard to FIG. 2, the reflecting member 40 may illustratively take the form of a glass rod secured to the assemblies 10 and 10b by suitable insulating adhesives 17 and 17b disposed between the reflective member 40 and the assemblies 10 and 10b. The insulating adhesives 17 and 17b are used to prevent the shorting of adjacent conductive strips 18. In an illustrative embodiment of this invention, the spacing of the reflective member 40 from the radiation sensitive devices 20 is large, as compared to the diffusion length of the photodiodes; further, the silicon substrate may be doped so that a barrier layer attenuates carrier diffusion from the reflective side to the radiation sensitive device side of the assembly. Barrier geometries are also possible and may be employed if more attenuation is required.

Though in FIGS. 1A and 1B, and 2, a preferred embodiment of this invention is shown as including an assembly including a semiconductor substrate and a reflective member 40 for optically isolating the reflective surfaces and the radiation sensitive devices, an alternative embodiment of this invention may be structured including an opaque, multilead plate having a photodiode or a plurality of photodiodes disposed upon a first surface thereof and a plurality of leads directed through the plate for controlling a corresponding mirror surface or set of mirror surfaces formed upon the opposite side of the multilead plate. Illustratively, the multilead plate may be made of opaque glass with conductive lead wires embedded therethrough. Alternatively, the multilead plate may be comprised of a crystal of silicon doped by diffusion through the thickness of the crystal plate to form the leads.

Figure 3:
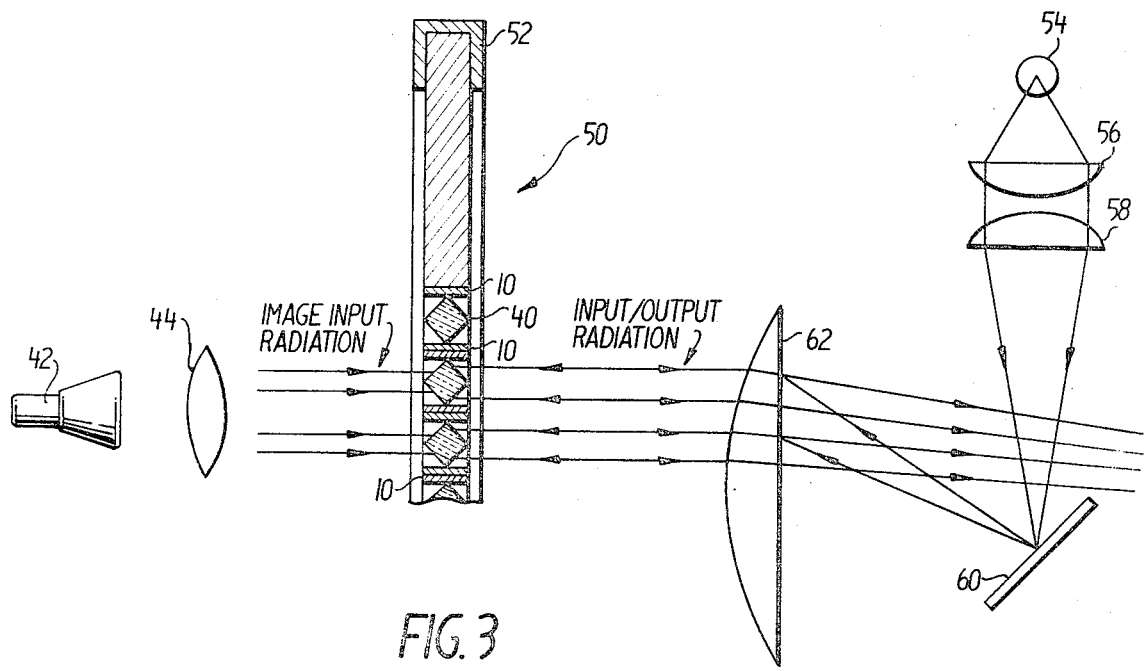
FIG. 3 is a schematic illustration of the arrangement of a plurality of the assemblies as shown in FIG. 2 to provide an array of radiation sensitive devices disposed to receive an input radiation image for providing a plurality of signals to control the deflection of an array of mirror surfaces whereby substantially uniform intensity radiation is modulated in accordance with the input radiation image.

With regard to FIG. 3, there is shown a further embodiment of this invention in which a plurality of the assemblies shown in FIG. 2 are "stacked" upon each other to form a matrix of mirror surfaces 16 capable of modulating an image. A plurality of units comprising assemblies 10 and 10b with a reflective member 40 are arranged one upon each to form a composite assembly 50 having an input face disposed to receive an input radiation image derived from a suitable image source such as a CRT 42. The CRT 42 displays an image upon the face thereof which is directed by a lens assembly schematically shown and identified by numeral 44 onto the input face of the composite assembly 50. More specifically, the input image radiation is directed and focused onto the plurality of reflective members 40 whereby discrete portions thereof are directed onto the plurality of radiation image devices 20 to produce output signals for controlling the corresponding mirror surfaces 16 disposed in an array upon the output face of the composite assembly 50. The plurality of individual assemblies are held together by a frame 52 disposed about the periphery of the composite assembly 50; further, the end portions of the assemblies 10 and 10b as well as the reflective members 40 may be configured to fit within the frame 52, whereby the assemblies 10 and 10b and in particular the reflective members 40 are critically aligned with respect to the input radiation derived from the CRT as well as the uniform intensity radiation derived from a source 54. Alternatively, the image source may be a hologram formed by coherent light from a laser.

In the illustrative embodiment shown in FIG. 3, a Schlieren-type optical system is shown for projecting an image of substantially uniform intensity radiation from the source 54 onto the output face of the composite assembly 50. Any of the several well-known Schlieren optical systems may be used of which one simple illustrative one is as follows. The radiation emitted by the source 54 is focused by a pair of planar-convex lenses 56 and 58 onto a mirror 60. The reflected radiation from the mirror 60 is focused by a planar-convex lens 62 onto the output face of the composite assembly 50, whereby the uniform-intensity radiation is directed by the plurality of the reflective members 40 onto their associated mirror surfaces 16. As explained above, each mirror surface 16 of the composite assembly 50 is deflected in accordance with the input radiation image so that incremental portions of the uniform radiation image directed onto the array of mirror surfaces are variously modulated dependent upon which of the mirror surfaces is deflected. If a mirror surface is deflected, the radiation directed thereto from the reflective member 40 will be misdirected so that it is intercepted by a stop, which may be the mirror 60, thus incremental portions of the image as derived from the composite assembly 50 will appear dark or black. Upon being reflected from the array of mirror surfaces, the modulated portions of the image are reflected from the corresponding members 40 onto the lens 62 to be focused, for example, to provide a display or for direct view.

Significantly, the radiation modulating apparatus shown in FIG. 3 may be used as a light amplifier. For example, the intensity of the light flux derived from the source 54 may be many times greater than that derived from the input image source 42. As a result, the original, low-intensity radiation image input is amplified many times. Further, the source 54 may emit a different type of radiation than that derived from the source 42. For example, the source 54 may illustratively take the form of a laser for generating coherent light onto the output face of a composite assembly 50, whereas the source 42 may be a CRT for directing a non-coherent, relatively low-intensity radiation image onto the input face of the composite assembly 50. In such an example, the composite assembly 50 modulates the coherent parallel beam of light derived from the laser to reflect therefrom a hologram to be used, for example, in an optical data processing system, the hologram being modulated by the mirror deflection pattern. In this example, the input radiation image is both non-coherent and of low light level so that no hologram could be formed thereby for effective image processing. However, the composite assembly, in accordance with the teachings of this invention, provides both image intensification and radiation conversion to provide a coherent modulated output.

In an illustrative embodiment of the composite assembly 50 as shown in FIG. 3, an array of mirror surfaces, each having a surface area of approximately $25\mu m^2$ wide, is formed along a linear array upon the assemblies 10 and 10b with a $50\mu m$ center-to-center spacing. The reflective members 40 may take the form of mirror rods having a square cross-section with a $250\mu m$ diagonal so that the linear arrays as formed of assemblies 10 and 10b are spaced two per $300\mu m$. Such a composite assembly would have a resolution of 3-lp/mm along the linear array (a direction normal to the surface of FIG. 3) and 10-lp/mm in a second, substantially vertical direction, as shown in FIG. 3. Further, in this illustrative embodiment, the thickness of the mirrors 16 was chosen to be $0.25\mu m$. Though mirrors of $0.45\mu m$ have been constructed, the smaller thickness of $0.25\mu m$ is preferred because of the reduced pull-in voltage required. Further, as particularly illustrated in FIG. 1B, the close spacing and aspect ratio of the mirror surface as a cantilever beam tend to reduce the pull-in voltage whereby relatively reasonable voltage levels, less than 10V, may be employed.

Thus, there has been shown a radiation modulating apparatus employing a plurality of mirror surfaces disposed in an array and capable of selectively modulating substantially uniform radiation derived from a first source in accordance with the various deflections imposed upon the mirror surfaces. Mirror deflection is controlled, in turn, by an input radiation image directed onto a corresponding array of radiation sensitive devices whose outputs are applied to control the deflection of the mirror surfaces. Further, suitable barrier means such as reflective mirrors are disposed between the radiation sensitive devices and the mirrors, which serves not only to isolate the radiation derived from the first source from the radiation sensitive devices, but also to direct the input radiation onto the radiation sensitive devices and to direct the uniform intensity radiation derived from the first source onto and the modulated radiation from the mirror surfaces to be displayed or for direct view.

Numerous changes may be made in the above-described apparatus and the different embodiments of the invention may be made without departing from the spirit thereof; therefore, it is intended that all matter contained in the foregoing description and in the accompanying drawings shall be interpreted as illustrative and not in a limiting sense.

What is claimed is:

1. Apparatus for modulating radiation derived from a first source in accordance with input radiation derived from a second source, said apparatus comprising:
   a. means responsive to the input radiation and disposed to receive the input radiation for providing an output dependent upon the intensity of the input radiation;
   b. mirror disposed to receive the radiation from said first source;
   c. means for mounting said mirror in cantilever fashion, to permit a free end of said mirror to be deflected;
   d. conductive means coupled to receive the output of said radiation responsive means for establishing a field in the vicinity of said mirror, whereby said mirror is deflected dependent upon the output of said radiation responsive means; and
   e. means for isolating said radiation sensitive means from the radiation derived from said first source.

2. Apparatus as claimed in claim 1, wherein said radiation responsive means and said mirror are mounted upon a common substrate, and said isolating means is disposed intermediate therebetween.

3. Apparatus for modulating radiation derived from a first source in accordance with input radiation derived from a second source, said apparatus comprising:
   a. means responsive to the input radiation and disposed to receive the input radiation for providing an output dependent upon the intensity of the input radiation;
   b. a mirror deflectively mounted to receive the radiation from said first source, said mirror being variably deflected dependent upon the output of said radiation responsive means whereby the radiation derived from said first source is modulated; and
   c. means for isolating said radiation sensitive means from the radiation derived from said first source and comprising a reflective member disposed between said radiation sensitive means and said mirror, said reflective member comprising a first reflective surface for directing the input radiation to said radiation responsive means, and a second reflective surface for directing the radiation derived from said first source to and the modulated radiation from said mirror.

4. Apparatus as claimed in claim 3, wherein said first source provides radiation of a first level of intensity and said second source provides radiation of a second level of radiation less than that of the first level.

5. Apparatus as claimed in claim 3, wherein said first source emits coherent radiation and said second source emits non-coherent radiation.

6. Apparatus for modulating radiation derived from a first source in accordance with an input radiation image derived from a second source, said apparatus comprising:
   a. a plurality of radiation responsive devices disposed to receive the input radiation image and for providing corresponding outputs dependent upon the intensity of the input radiation image;

b. a plurality of corresponding mirrors disposed to receive the radiation from said first source, each of said mirrors being variably deflected dependent upon the output of its corresponding radiation responsive device whereby the radiation derived from said first source is modulated in accordance with the input radiation image, each of said radiation responsive devices and mirrors being mounted upon a common substrate;

c. each of a plurality of conductive elements for receiving the output of a radiation responsive device for establishing a deflecting field in the vicinity of its corresponding mirror; and d. means disposed intermediate of said plurality of radiation responsive devices and said plurality of mirrors for isolating said plurality of radiation responsive elements from the radiation derived from said first source.

7. Apparatus as claimed in claim 6, wherein a plurality of said units is arranged with respect to each other to form a first two-dimensional array of said radiation responsive means disposed to receive an image of the input radiation, and a second two-dimensional array of said mirrors disposed to receive the radiation of substantially uniform intensity from said first source and to modulate the uniform-intensity radiation in accordance with the various degrees of deflection of said plurality of mirrors.

8. Apparatus as claimed in claim 7, wherein there is included a Schlieren optical assembly for projecting the radiation derived from said first source onto said second two-dimensional array of mirrors and for directing the modulated radiation therefrom.

9. Apparatus for modulating radiation derived from a first source in accordance with input radiation derived from a second source, said apparatus comprising:

a. means responsive to the input radiation and disposed to receive the input radiation for providing an output dependent upon the intensity of the input radiation, said radiation responsive means comprising a semiconductor substrate of a first conductivity type and a first region formed within a surface of said substrate of a second conductivity type opposite to said first conductivity type;

b. a mirror deflectively mounted to receive the radiation from said first source, said mirror being variably deflected dependent upon the output of said radiation responsive means whereby the radiation derived from said first source is modulated, said mirror being deflectively mounted upon said surface of said substrate by a pedestal; and c. means for isolating said radiation sensitive means from the radiation derived from said first source.

10. Apparatus as claimed in claim 9, wherein said mirror comprises a layer disposed upon said pedestal having a reflective surface for receiving the radiation from said first source and of a thickness sufficient to facilitate deflection to a sufficient degree to permit optical modulation.

11. Apparatus as claimed in claim 10, wherein the thickness of said layer is in the order of $0.25 \mu m$.

12. Apparatus as claimed in claim 9, wherein said radiation responsive means comprises said first region and a second region of said second conductivity type separated by a channel formed of a portion of said substrate, and a gate electrode disposed over said chanel and spaced therefrom by an insulating layer.

13. Apparatus as claimed in claim 12, wherein a plurality of radiation responsive means is formed upon said substrate in a linear array, each of said radiation devices comprising a common second region and a common gate electrode and discrete first regions for each of said radiation responsive means.

14. Apparatus as claimed in claim 13, wherein there is included a plurality of said mirrors disposed in a linear array upon said substrate, and a plurality of conductive strips coupled to said discrete first regions of said radiation responsive means for applying discrete outputs thereof to control independently the deflection of each of said plurality of mirrors in accordance with the input radiation directed onto each of said plurality of radiation responsive means.

* * * * *